(12) United States Patent
Hawkins, Jr. et al.

(10) Patent No.: US 12,510,345 B2
(45) Date of Patent: Dec. 30, 2025

(54) COUNTERSINK PRESET MEASUREMENT DEVICE

(71) Applicants: Kevin Lee Hawkins, Jr., Edward, NC (US); Barbara Zuleika Cufre, Edward, NC (US)

(72) Inventors: Kevin Lee Hawkins, Jr., Edward, NC (US); Barbara Zuleika Cufre, Edward, NC (US)

( * ) Notice: Subject to any disclaimer, the term of this patent is extended or adjusted under 35 U.S.C. 154(b) by 483 days.

(21) Appl. No.: 18/099,128

(22) Filed: Jan. 19, 2023

(65) Prior Publication Data

US 2023/0228550 A1    Jul. 20, 2023

Related U.S. Application Data

(60) Provisional application No. 63/301,261, filed on Jan. 20, 2022.

(51) Int. Cl.
*G01B 3/28* (2006.01)
*G01B 5/18* (2006.01)

(52) U.S. Cl.
CPC  *G01B 3/28* (2013.01); *G01B 5/18* (2013.01)

(58) Field of Classification Search
CPC .................................. G01B 3/28; G01B 51/18
USPC ........................................................... 33/836
See application file for complete search history.

(56) References Cited

U.S. PATENT DOCUMENTS

| | | | | |
|---|---|---|---|---|
| 4,905,378 A | * | 3/1990 | Culver | G01B 3/28 |
| | | | | 33/833 |
| 10,254,100 B2 | * | 4/2019 | Loubet | B21J 15/142 |
| 2003/0217479 A1 | * | 11/2003 | Shen | G01B 3/28 |
| | | | | 33/836 |

* cited by examiner

*Primary Examiner* — Laura Martin
(74) *Attorney, Agent, or Firm* — Kamran Emdadi

(57) ABSTRACT

An example device includes a housing including a top portion, and a lower portion which connect together to house a spring, and a bushing disposed inside the housing with a backside of a bushing rested against the spring, and the backside of the bushing is in contact with a probe tip of a depth measurement gauge disposed in a top portion of the housing.

7 Claims, 7 Drawing Sheets

COUNTERSINK PRESET MEASUREMENT DEVICE

TECHNICAL FIELD OF THE APPLICATION

This application relates to a counter-sink calibration device, and more particularly, a counter-sink pre-set tool that measures a depth setting of a countersink cutter before performing a counter-sink cut.

BACKGROUND OF THE APPLICATION

Conventionally, counter-sunk and counterbore holes are required for all sorts of purposes, such as rivet or fastener cutting, hiloks, highlites, huckbolts, etc. Countersinking for fasteners includes precision equipment for specific angle requirements and depth requirements. The process includes multiple operations to complete, including measuring the countersunk hole prior to fastener install and fastener depth after install via separate equipment. It is important not to cut the holes too deep as the hole can be burdensome to rectify if cut beyond a certain width/depth.

Cutting holes into the 'skins' and structure of certain materials, such as sheets of metal, plastic, carbon fiber, etc., is an important part of the airline industry as well as the ship building industry and other heavy industrial applications. Being able to cut and measure contemporaneously could alleviate additional operations performed before the drilling/cutting process.

SUMMARY OF THE APPLICATION

Example embodiments of the present application provide a housing including a top portion, and a lower portion which connect together to house a spring, and a bushing disposed inside the housing with a backside of a bushing rested against the spring, and the backside of the bushing is in contact with a probe tip of a depth measurement gauge disposed in a top portion of the housing.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus and/or system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
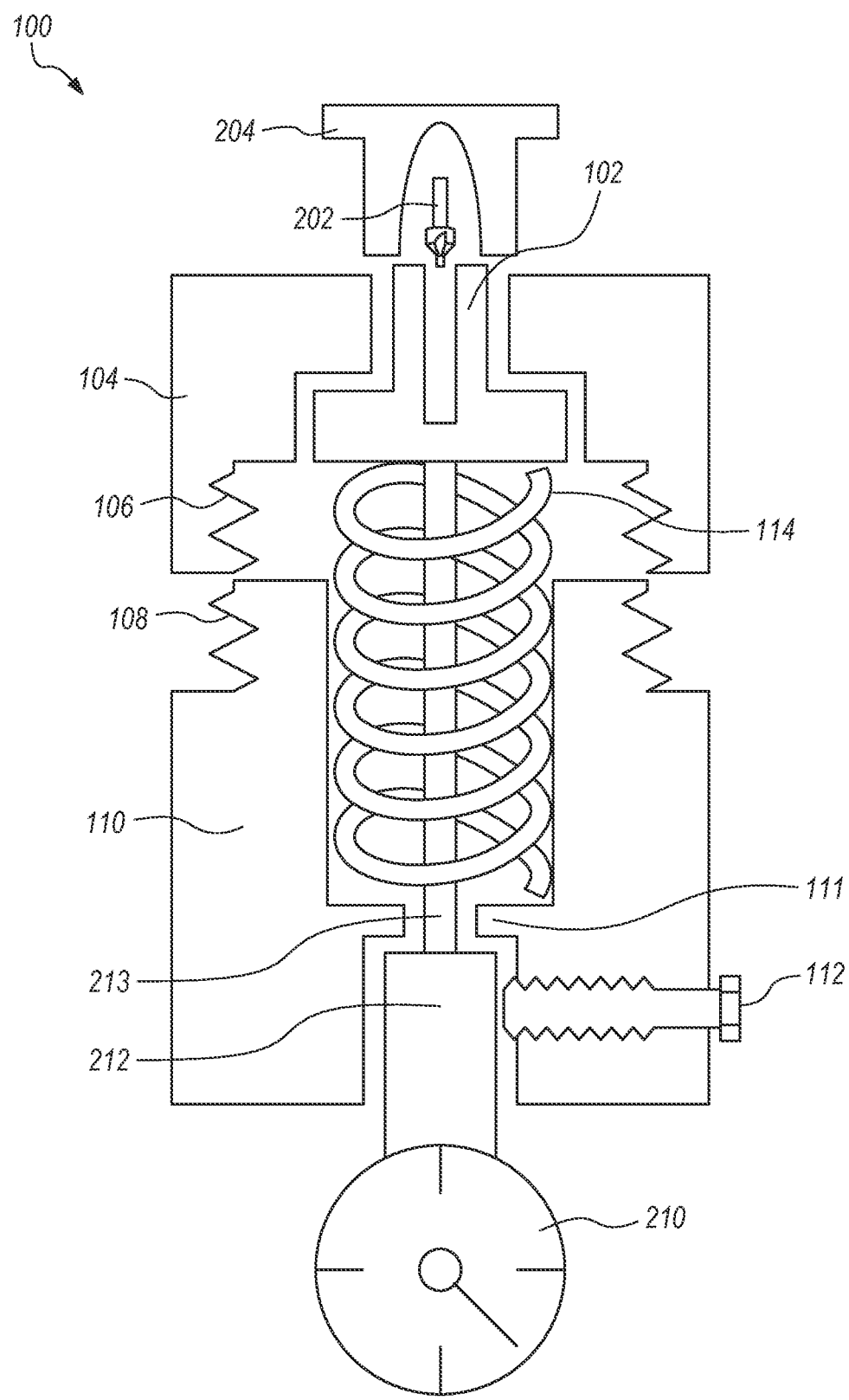
FIG. 1 illustrates an example of the counter-sink calibration device according to example embodiments.

FIG. 1 illustrates a cross-sectional view of an example of counter-sink hole cutting tool/device and corresponding bushing and spring housing according to example embodiments. Referring to FIG. 1, the tool 100 includes a variety of separate pieces or 'components'. Some of the components are not part of the device and are merely auxiliary components which operate with the device to provide an accurate measuring instrument.

In one example, a tool body or housing includes two parts 104 and 110 that are cylindrical and which screw into one another to 'house' the bushing 102 and the spring 114. In one example, the parts include a bottom half 104 of the housing that can screw into a top half 110 to create a continuous cylindrical housing via screw threads 106/108 on both halves of an interior and/or exterior portion of the housing halves. Inside the housing is the counter-sink pilot adapter/bushing 102 along (one of many different sized bushings) with a spring 114 that holds the bushing in place for use during a measurement process. The gauge probe device has a corresponding gauge head/face 210 that measures distance/displacement and which can be inserted inside the housing through an hole in the top half 110 to measure a depth/distance. The gauge probe includes the face or dial 210, the probe sheath 212 as a larger extension that houses the probe 213 which can be pressed in and out of the probe sheath to create a distance measurement on the face dial 210.

The probe sheath 212 may rest against a lip 111. The probe sheath 212 may be held in place by a screw 112 to press against the body of the probe sheath 212 or via a different securing mechanism. The lip 111 also prevents the probe sheath from entering the internal housing area, which the probe tip enters and presses against the back side of the bushing. The counter-sink 204 may have a head or center portion that is a piloted countersink cutter 202 used to bore an angled-edged hole in metal or other material. The hole may have an angled-edge but must have a certain depth so the fastener can be recessed into place to be set to a desired depth mounted against an outer surface of the material where the fastener is installed.

In use, a standard piece of metal can be used with the counter-sink body base 204 so the counter-sink cutting bit 202 can be engaged with the metal to provide a specific sized hole cut into the metal. Instead of having to pre-cut the holes and measure the depths separately, this example embodiment provides a way to measure depth via the depth gauge 210 and probe 212 before the cutting occurs, this saves the arduous operation of cutting, measuring and cutting again and measuring again to create a perfectly sized hole. Multiple adjustments, measurements and cutting operations can be reduced by this tool to save time while avoiding under-cutting or over-cutting the hole depth. Once the measuring is performed and a known depth for a cut is identified, the counter-sink cutter 204 can be adjusted to a certain depth and then used to perform the cut operation. The need to measure the cut after the cut is performed is alleviated since the adjustment and depth measurement was performed prior to any cutting was performed.

Figure 2:
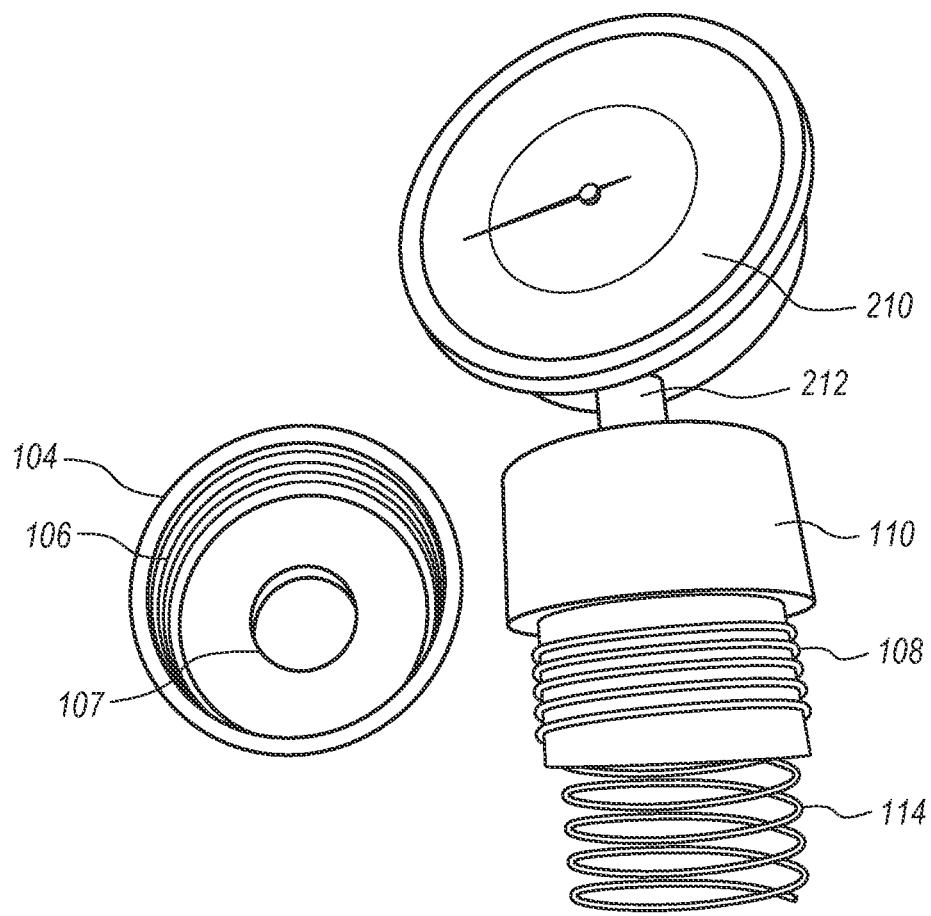
FIG. 2 illustrates an example of the calibration device housing in an open configuration according to example embodiments.

FIG. 2 illustrates an example of the housing in an open configuration according to example embodiments. Referring to FIG. 2, the example includes an internal view of the bottom half of the housing 104 with a bushing tip hole 107 that permits the bushing tip to protrude through the bushing tip hole while the bushing body is still locked inside the housing. The thread 106 of 104 may be screwed onto the top half of the housing 110 which also has a threaded surface 108.

The spring 114 may be placed into the space formed by the housing in its closed state. The probe device has three parts including the probe needle 213 which makes contact with the backside of the bushing and a probe sheath 212 which is larger in diameter and may rest against a lip inside a hole on the top surface of the top portion 110 and the probe needle 213 can pass through the hole or insertion point in the top surface cavity and inside the spring body to reach the backside of the bushing 102. The spring serves to hold the weight of bushing in place to create a spring force that permits the bushing to protrude through a hole in the bottom portion of the housing and to be pressed against a surface during a measurement calibration procedure. The probe needle can then press against the backside of the bushing when the bushing tip is outside the body of the housing. As the extending front part of the bushing (i.e., bushing column) is pressed against a surface of a material, the spring will compress and the probe needle will be pressed into the probe body by the backside of the bushing to provide a measurement of depth. It is important to note that the length of the top portion and the bottom portion of the housing may not be the same size in length but will generally have the same diameter. The top portion of the housing is shown to be longer than the bottom portion, however, this is merely exemplary and sizes may vary as is known to those skilled in the art.

Figure 3:
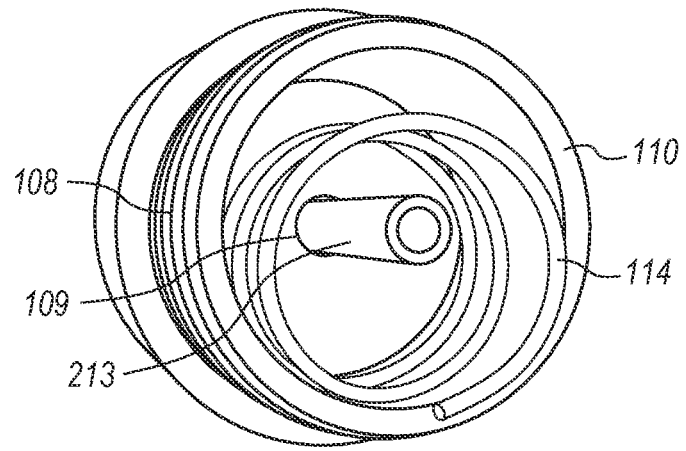
FIG. 3 illustrates an example of an internal view of the housing in an open configuration according to example embodiments.

FIG. 3 illustrates an example of an internal view of the housing in an open configuration according to example embodiments. Referring to FIG. 3, the top half 110 is illustrated with the spring 114 inserted into the body cavity of the top half 110 along with the probe needle 213 which extends out of the probe sheath 212 into the body of the top housing half 110 through a probe hole 109 in a top of the top housing half 110. The probe sheath 212 will be pressed against a lip 111 to prevent the probe sheath from moving past the surface of the lip 111. Only the probe can pass through the opening 109.

Figure 4:
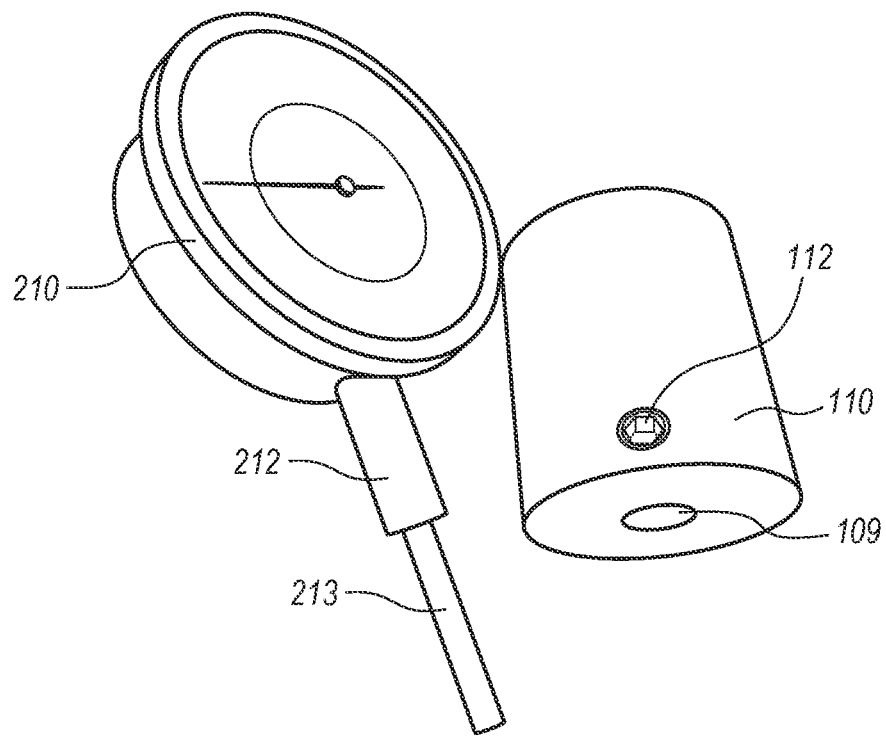
FIG. 4 illustrates an example of a depth gauge and a top portion of the housing in an open configuration according to example embodiments.

FIG. 4 illustrates an example of the depth gauge and the top portion of the housing in an open configuration according to example embodiments. Referring to FIG. 4, the probe 210 has a probe sheath 212 and probe needle 213 which will be inserted into the top hole 109 of the top half 110 and which may be held in place by a screw maneuvered by a hex configuration 112 which can be tightened or loosened by a hex wrench (Allen wrench), not shown. The probe sheath 212 will fit into the hole 109 but will be prevented from entering the housing internal area by a lip 111 that causes the hole 109 to narrow from its external diameter to a smaller diameter created by the lip 111. The probe tip 213 is the only portion of the probe that can pass past the lip 111 into the internal area of the housing.

Figure 5:
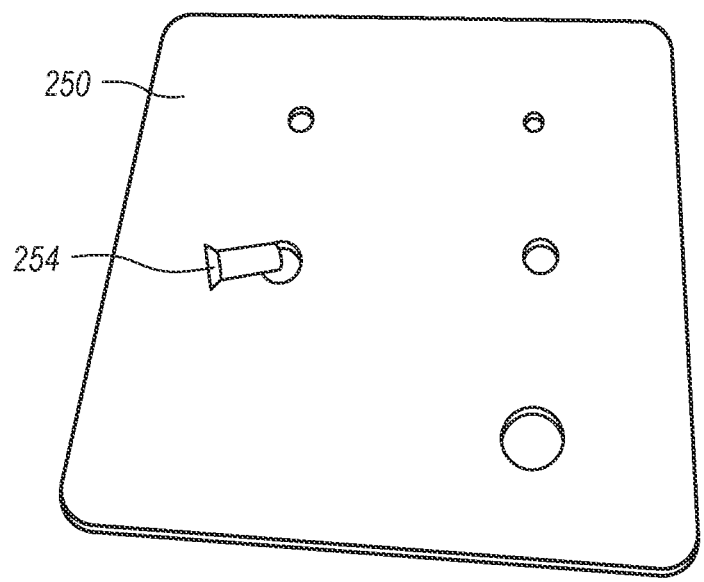
FIG. 5 illustrates an example of an index tool according to example embodiments.

FIG. 5 illustrates an example of an index tool according to example embodiments. Referring to FIG. 5, the various holes in the index tool 250 represent different sizes for different sized fasteners 254. Once a hole size is selected that matches the diameter for the fastener shank to permit the entirety of the countersunk head to rest protruding from the surface of the index tool 250, the probe 210 can be used to measure a certain depth that is desired to be drilled by the counter-sink drill. The gauge may be calibrated to '0' to ensure an accurate reading prior to measuring the desired depth (see FIG. 7). The front of the bushing (i.e., the extended column) is pressed against the fastener head while it is inside the correct hole size of the index tool 250. The bushing will move backwards against the spring 114 and the probe tip 213 to provide a probe reading on the probe face 210.

Figure 6:
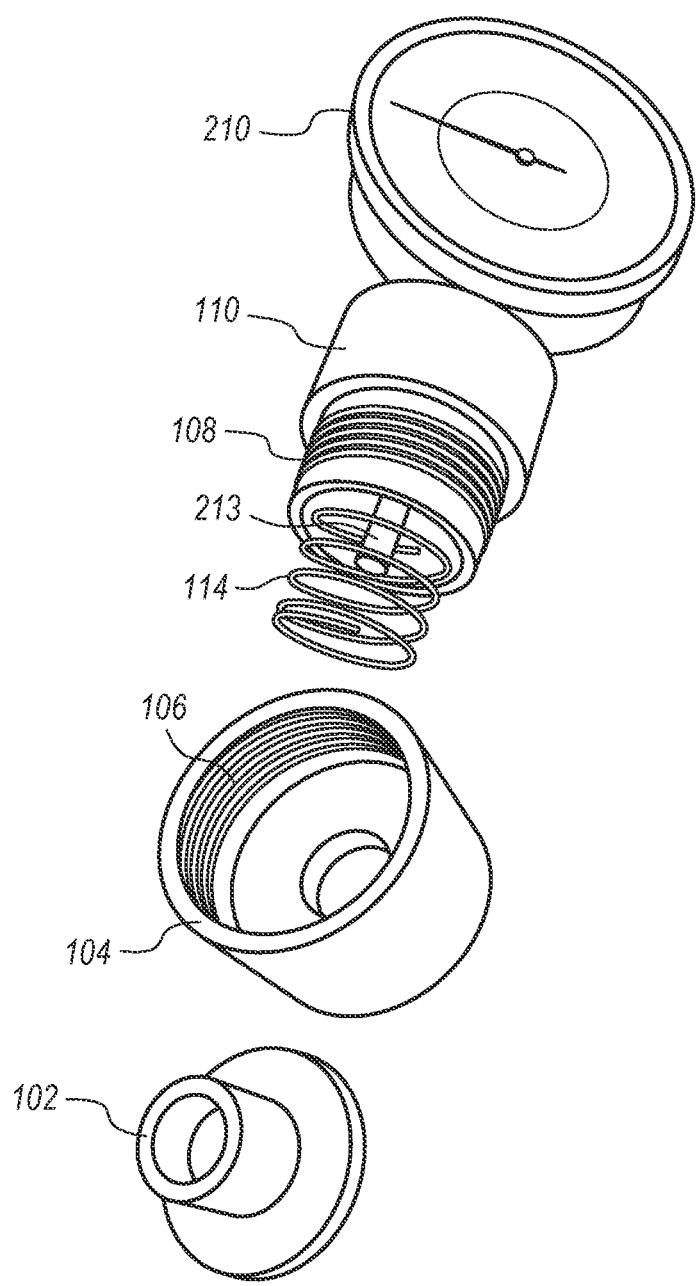
FIG. 6 illustrates another example of the housing in an open configuration with the bushing according to example embodiments.

FIG. 6 illustrates another example of the bushing housing in an open configuration according to example embodiments. Referring to FIG. 6, the open configuration demonstrates how the bushing 102, the bottom half 104, the spring 114, the top half 110 and the gauge and probe needle 213 are aligned to measure a fastener depth prior to drilling a hole.

Figure 7:
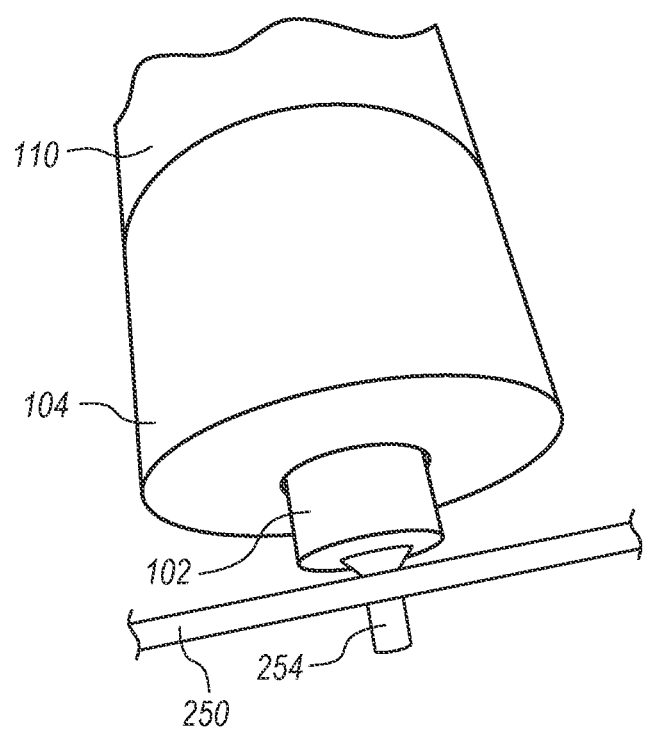
FIG. 7 illustrates an example of a close-up view of the bushing protruding from the housing and being aligned against the index tool and a fastener according to example embodiments.

FIG. 7 illustrates an example of a close-up view of the bushing top portion (i.e., bushing column) protruding from the bushing housing and being aligned against the index tool 250 according to example embodiments. Referring to FIG. 7, the bushing tip/top of the bushing 102 is pressed against the fastener 254 as it is placed in the hole of the index tool 250 to measure the depth needed.

Figure 8:
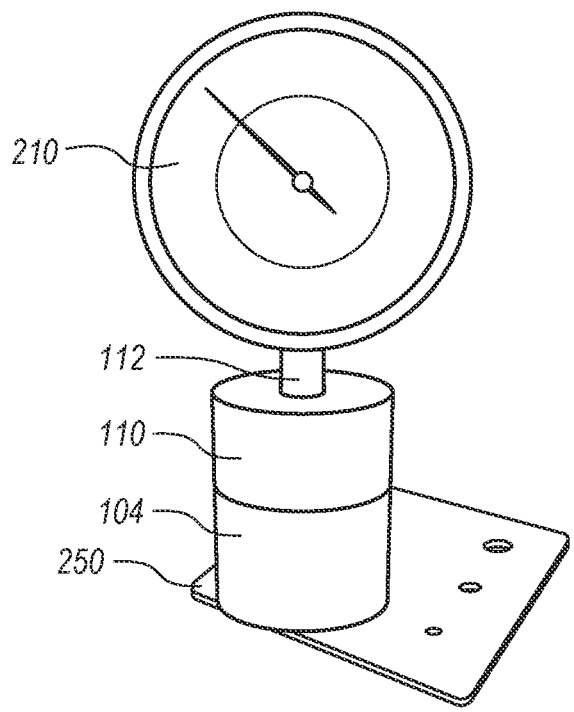
FIG. 8 illustrates an example of the housing pressed against the index tool to identify a depth measurement of a fastener according to example embodiments.

FIG. 8 illustrates an example of the housing pressed against the index tool to identify a depth measurement of a fastener according to example embodiments. The spring 114 will provide a resistance for the bushing as it is inside the housing body 110/104. The bushing may be pressed down on the fastener head and the probe will press against the backside of the bushing to provide a compression and measurement depth to the gauge head 210. The depth is identified by the measurement gradients on the gauge face. The counter-sink can be adjusted to the correct size and drilling can now be performed by the counter-sink drill, which is adjusted to match the measurement identified.

Figure 9:
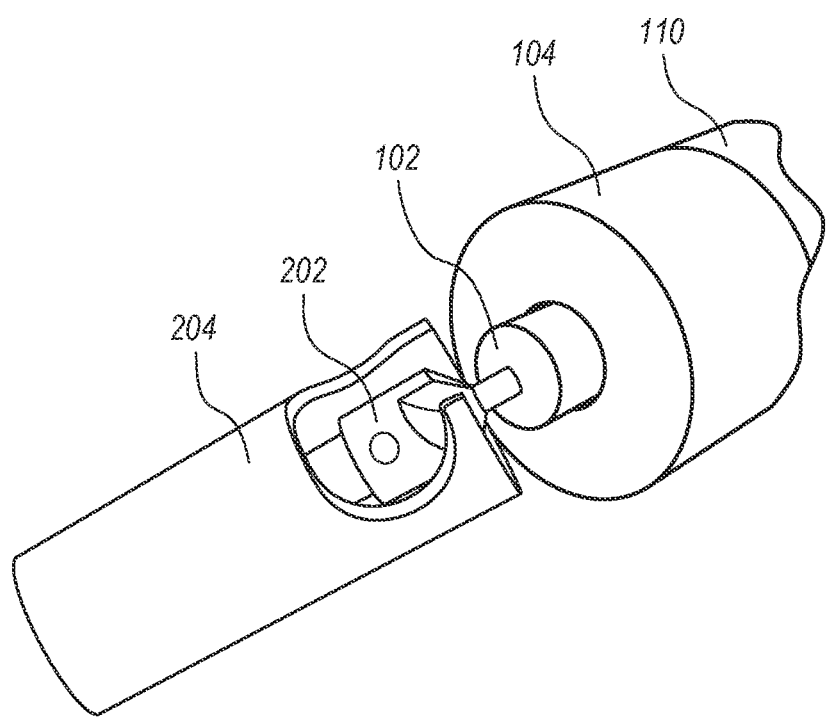
FIG. 9 illustrates an example of a close-up view of a counter-sink drill being aligned with a bushing protruding from the housing to perform a depth measurement according to example embodiments.

FIG. 9 illustrates an example of a close-up view of a counter-sink drill with a pilot tip being aligned with a bushing protruding from the housing according to example embodiments. Referring to FIG. 9, the countersink 204 and drill head 202 can be adjusted to match the measured depth identified by the gauge and housing configuration of an appropriately sized bushing 102. The drilling can then be performed by the counter-sink drill without trial and error drilling being performed since the measurement is performed and the adjustment is already performed.

Figure 10:
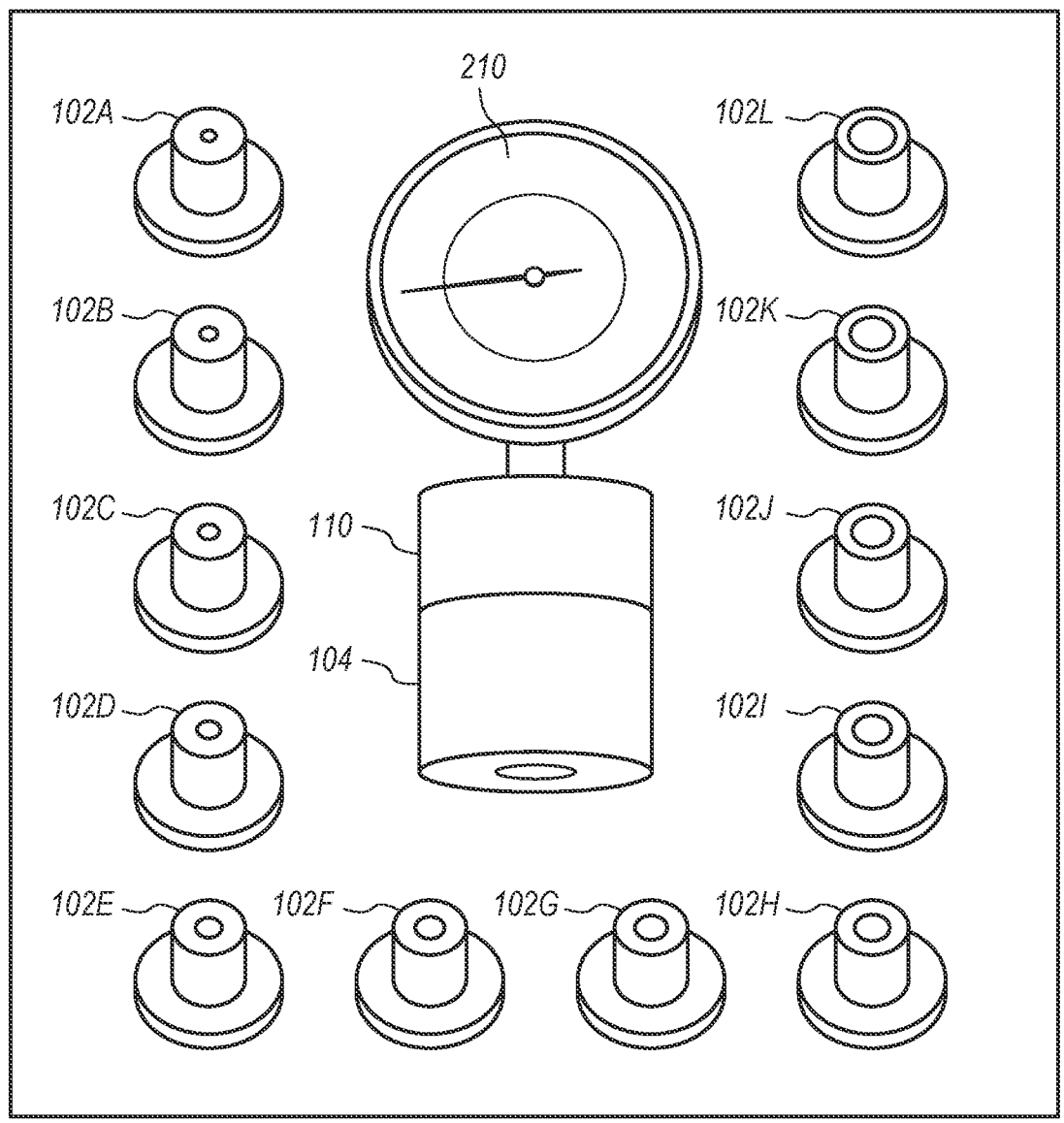
FIG. 10 illustrates an example of the measurement device in a kit with various different sized bushings according to example embodiments.

FIG. 10 illustrates an example kit of the various different sized bushings and the bushing housing and measurement device according to example embodiments. Referring to FIG. 10, the housing 110/104 may include the spring 114 (not shown) inside the housing. The various different bushing sizes (e.g., 0.098 through 0.338 inches) may be metric or standard sizes. The bushing tip holes of the various bushings 102A-102L will increase in diameter and vary in width to accommodate the different sized counter-sink cutters. However, the exterior width of the bushing columns will stay the same size which is slightly smaller than the hole at the bottom of the bottom portion of the housing.

According to one example embodiment, the tool may include a housing that has a top portion 110 and a lower portion 104 which connect together to house a spring 114. A bushing is disposed inside the housing with a backside of a bushing rested against the spring, and the backside of the bushing is in contact with a probe tip 213 of a depth measurement gauge disposed in a top portion of the housing via a hole with a lip 111.

The hole in the lower portion where the bushing column protrudes through the hole has a larger diameter than a diameter of a hole in the top portion (FIG. 1 is not drawn to scale). The top portion and the lower portions are cylindrically shaped and the holes are circular and are located in center portions of the respective top and lower portions between the cavity of the housing. The top and the lower portions each include threaded portions 108 and 106 to screw into one another to form a flush cylinder as the housing. The backside of the bushing is circular and has a smaller diameter than a diameter of a cross-sectional area of a cavity inside the housing so it can move freely inside the cavity area. The backside of the bushing has a larger diameter than a front side of the bushing which comprises a raised hollow column that extends away from the bushing. That column may protrude out of the housing to match a counter-sink bit with a pilot head (although a pilot head bit is not required to use this device). The raised hollow column extends from the bushing base and has a smaller diameter than a hole in the bottom portion of the housing, and the raised hollow column extends through the hole in the bottom portion to an outside area of the housing and is held in position by the spring 114 which is pressed against the backside of the bushing. The backside of a bushing base compresses the spring when a front side of the bushing is pressed against a surface. A screw disposed on the top portion holds a probe sheath of the depth measurement gauge in position while the probe tip extending from the probe sheath is in contact with the backside of the bushing inside the housing. The top portion includes a lip 111 inside the top hole of the top portion that extends horizontally with respect to an area of the top hole, such as a cylindrical shelf around the internal area of the housing, and the probe sheath rests against the lip and the probe tip extends past the lip into the housing cavity. The lip is disposed lower down in the top hole than a location of the screw inside the top hole. A top hole in the top half has a smaller diameter than a lower hole in the lower half where a bushing column of a front portion of the bushing protrudes through the lower hole.

The device is ideally metal, such as steel or aluminum or a mixture of metals. Plastic would work as well along with poly plastics which are a mixture of materials. The product may be manufacture by injection molding, casting, boring processes and related manufacturing processes.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., hardware devices, etc.) thereto.

What is claimed is:

1. An apparatus comprising:
a housing comprising
a top portion, and
a lower portion which connect together to house a spring; and
a bushing disposed inside the housing with a backside of a bushing rested against the spring, wherein the backside of the bushing is in contact with a probe tip of a depth measurement gauge disposed in a top portion of the housing, and
wherein the bushing has a first circular surface area portion that rests against an inside lip of the lower portion, and
wherein the bushing has a bushing column extending away from the lower portion with a circular top having a second circular surface area, with a smaller diameter than the first circular surface area, and a bushing tip hole cavity portion at a center of the bushing column, and
wherein the bushing column protrudes outside a surface area of the lower portion to make flush contact with a resting surface while the depth measurement gauge measures a depth of a fastener disposed on the resting surface and inside the bushing column.

2. The apparatus of claim 1, wherein a hole in the lower portion has a larger diameter than a diameter of a hole in the top portion.

3. The apparatus of claim 1, wherein the top and the lower portions each include threaded portions to screw into one another to form a flush cylinder as the housing.

4. The apparatus of claim 1, wherein the backside of the bushing is circular and has a smaller diameter than a diameter of a cross-sectional area of a cavity inside the housing.

5. The apparatus of claim 4, wherein the backside of the bushing has a larger diameter than a front side of the bushing which comprises a raised hollow column that extends away from the bushing.

6. The apparatus of claim 1, wherein the backside of a bushing base compresses the spring when a front side of the bushing is pressed against a surface.

7. The apparatus of claim 1, wherein a screw disposed on the top portion holds a probe sheath of the depth measurement gauge in position while the probe tip extending from the probe sheath is in contact with the backside of the bushing inside the housing.

\* \* \* \* \*